US009338115B2

(12) United States Patent
Thompson et al.

(10) Patent No.: US 9,338,115 B2
(45) Date of Patent: May 10, 2016

(54) CONTENT BASED MESSAGE DELIVERY (75) Inventors: William Thompson, Redmond, WA (US); Krishna Kumar Parthasarathy, Redmond, WA (US); Prasanta Ghosal, Bellevue, WA (US); Shrey Shah, Redmond, WA (US); Shaun Wallace, Tacoma, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 13/569,769

(22) Filed: Aug. 8, 2012

(65) Prior Publication Data

US 2014/0047039 A1 Feb. 13, 2014

(51) Int. Cl.
*G06F 15/16* (2006.01)
*H04L 12/58* (2006.01)

(52) U.S. Cl.
CPC ...................................... *H04L 51/24* (2013.01)

(58) Field of Classification Search
CPC ...... G06F 15/163; G06F 15/16; G06F 15/173
USPC .......................................... 709/226, 206, 239
See application file for complete search history.

(56) References Cited

U.S. PATENT DOCUMENTS

| 2003/0212818 | A1* | 11/2003 | Klein et al. | 709/238 |
| 2004/0193915 | A1* | 9/2004 | Smith et al. | 713/200 |
| 2007/0248019 | A1 | 10/2007 | Feng et al. | |
| 2010/0027554 | A1 | 2/2010 | Kuthan et al. | |
| 2010/0186062 | A1 | 7/2010 | Banti et al. | |
| 2010/0188975 | A1* | 7/2010 | Raleigh | 370/230.1 |
| 2010/0293128 | A1* | 11/2010 | Sanders et al. | 706/48 |
| 2010/0324987 | A1* | 12/2010 | Benisti et al. | 705/14.39 |

OTHER PUBLICATIONS

Sendmail, Inc.; "Sentrion Cloud Services for Spam and Virus Filtering;" Mar. 2009; pp. 1-3; Senmail, Inc.; Emeryville, CA; http://www.sendmail.com/pdfs/whitepapers/sentrion_cloud_services.pdf.
Check Point Software Technologies Ltd.; "Check Point VSX;" May 26, 2011; pp. 1-5; Check Point Software Technologies Ltd.; http://www.checkpoint.com/products/vpn-1-power-vsx/index.html.
Websense; "Websense Essential Information Protection," Apr. 28, 2011; pp. 1-4; http://www.websense.com/content/support/library/email/v76/esg_release_notes/rel_notes_features_pem_esg.aspx#597315.

\* cited by examiner

*Primary Examiner* — David Lazaro
*Assistant Examiner* — Zia Khurshid
(74) *Attorney, Agent, or Firm* — Damon Rieth; Aaron Hoff; Micky Minhas (57) ABSTRACT

Provided herein are systems, methods, and software for facilitating message sessions. In one implementation, a notification is received relating to a message submitted for delivery on behalf of a sender to a recipient. The message includes several components. At least one delivery policy is identified based on the content identified in at least one of the components. Delivery of the message is initiated according to the delivery policy.

20 Claims, 5 Drawing Sheets

CONTENT BASED MESSAGE DELIVERY

TECHNICAL FIELD

Aspects of the disclosure are related to computer hardware and software technologies and in particular to messaging systems, software, and environments.

TECHNICAL BACKGROUND

In the fields of computing and communications, users have become accustomed to ubiquitous access to their messages and messaging services. For instance, email can now be accessed on nearly any kind of communication device from almost any location. Client applications and devices typically engage with messaging environments to send, receive, forward, and store messages, as well as to perform other operations. Examples of message services include email, voicemail, text, and unified communication services.

Messaging environments may generally be considered to include sending environments and recipient environments. Sending clients submit messages to sending environments, which then transmit the messages to recipient environments. Recipient clients communicate with the recipient environments to download or otherwise gain access to the messages. Resources may be dedicated exclusively either to sending or receiving roles or may be deployed in support of either type of environment.

Messages are typically routed based on identities, such as an email address, represented within the address component of a message. An address record for the domain corresponding to the identity may then be consulted to identify the address for the domain with which to establish a message session. Upon establishing the session, communications may be exchanged between the sending environment and the recipient environment to facilitate delivery of messages. Various configuration controls allow for changes to how messages are routed, as well as for the application of other features, such as security.

OVERVIEW

Provided herein are systems, methods, and software for facilitating message sessions. In one implementation, a notification is received relating to a message submitted for delivery on behalf of a sender to a recipient. The message includes several components. At least one delivery policy is identified based on the content identified in at least one of the components. Delivery of the message is initiated according to the delivery policy.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations described herein provide for enhanced message services whereby messages may be routed based at least in part on content within the messages. In at least one implementation disclosed herein, messages may be examined for content represented in various components of each message. A delivery policy may then be identified based on the relevant content and the messages routed accordingly.

In a brief operational example, a particular delivery policy may be chosen based upon an evaluation of the content of a message. Content may be found in a variety of message components, such as the message body, subject line, attachments, sender field, and recipient field, as well as other components. Delivery policies may be generated via configuration tools, allowing for an administrator or other personnel to create delivery policies according to which messages may be routed.

While most messages may remain ultimately routable based on the recipient address indicated therein, the paths, equipment, and other elements involved in routing may be defined by various delivery policies. For instance, some example delivery policies may specify which servers to utilize and which intermediate environments to traverse.

Figure 1:
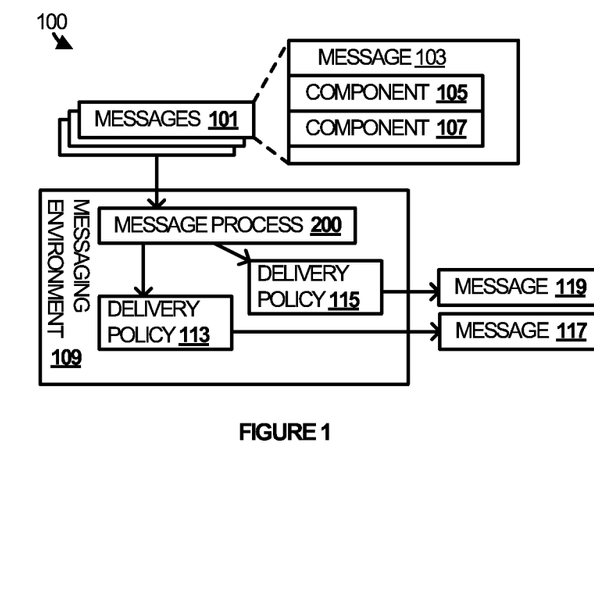
FIG. 1 illustrates an operational scenario with respect to a messaging environment in an implementation.
Figure 2:
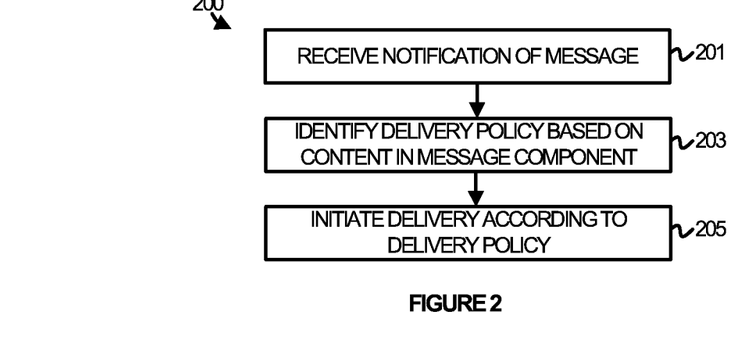
FIG. 2 illustrates a message process in an implementation.
Figure 3:
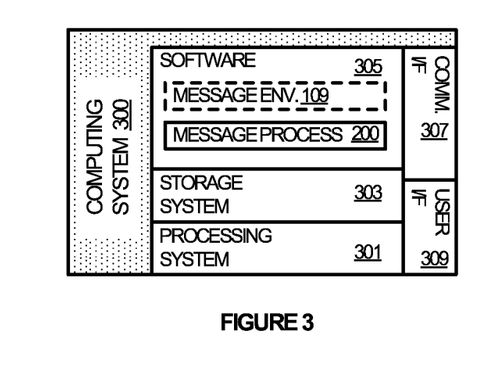
FIG. 3 illustrates a computer system for implementing various processes, scenarios, and environments disclosed herein.
Figure 6:
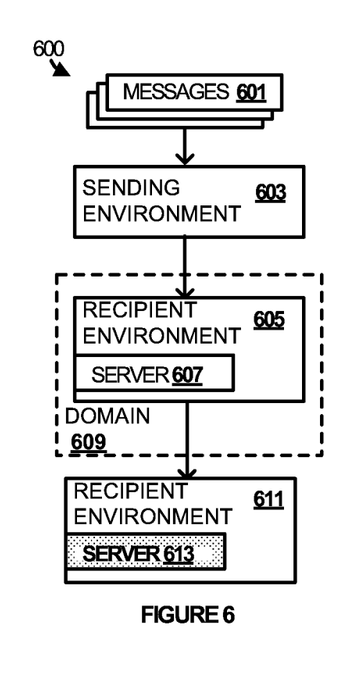
FIG. 6 illustrates an operational scenario with respect to a sending environment and a recipient environment in an implementation.
Figure 7:
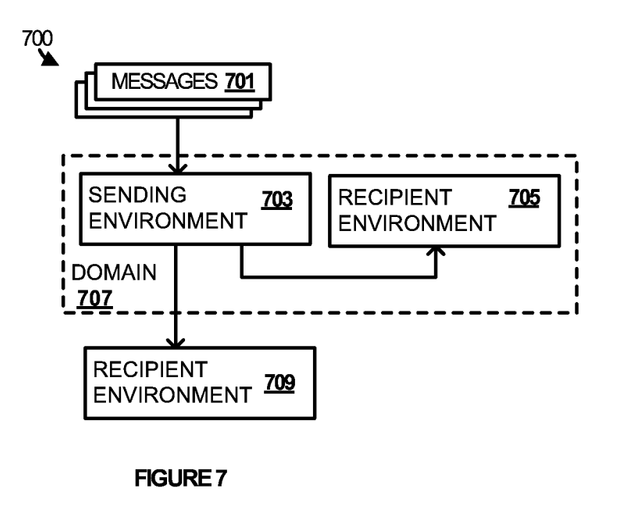
FIG. 7 illustrates an operational scenario with respect to a sending environment and a recipient environment in an implementation.
Figure 8:
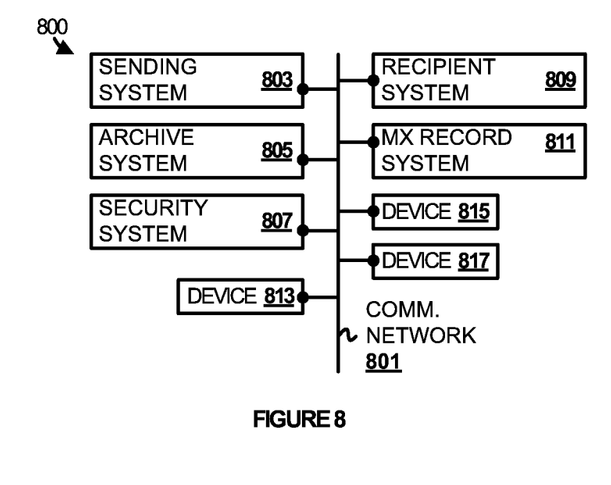
FIG. 8 illustrates a messaging architecture in an implementation.
Figure 9:
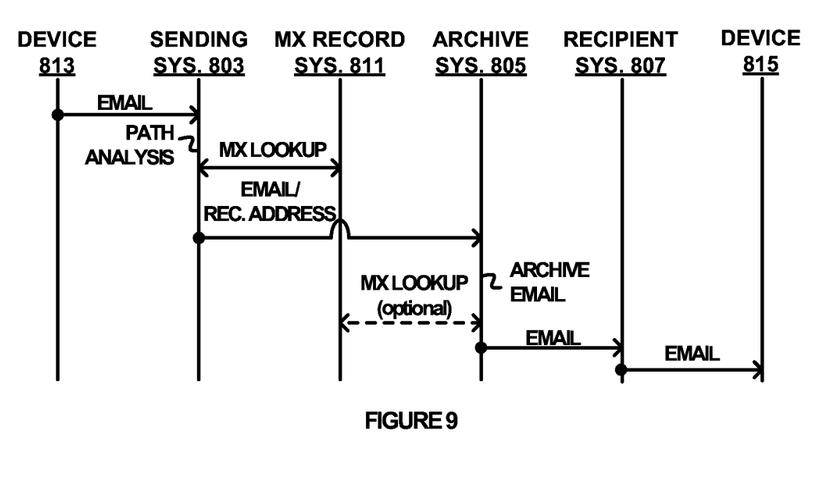
FIG. 9 illustrates an operational sequence in an implementation.

Referring to FIGS. 1-9, FIG. 1 illustrates one operational scenario involving the process of FIG. 2, while FIG. 3 illustrates a suitable computing system for implementing the scenario and process. FIGS. 4-7 illustrates several more operational scenarios. FIG. 8 illustrates a representative architecture while FIG. 9 illustrates a sequence of operations that may be implemented in the architecture.

Turning now to FIG. 1, illustrated is operational scenario 100 whereby messages are received and handled in accordance with message process 200. The following discussion of FIG. 1 will make parenthetical reference to the steps illustrated by message process 200 for purposes of clarity. Note the additional steps may be considered within the scope of this disclosure.

Operational scenario 100 involves the handling of messages 101 by messaging environment 109. Each messages, as exemplified by message 103, may include multiple components, such as component 105 and component 107. Examples of message components include, for example, the sender field, copy field, recipient field, message body, subject line, and attachments, as well as any other type of message component, combination, or variation thereof within which content may be included or otherwise represented. Examples of content include the identity of the sender, the identity of the recipient, the text information included in the message body, the text information or images contained within attachments, and the text of subject lines, as well as any other type of content, combination, or variation thereof.

Message clients may generate messages for delivery to recipients by way of messaging environment 109. Messaging environment 109 may allow for clients to perform a variety of well-known messaging functions that need not be discussed at length here, such as sending, receiving, forwarding, and archiving messages. Messaging environment 109 may be any system, collection of systems, or software, or any combination or variation thereof, capable of handling messages in this manner. Examples of such systems and software include email servers, voicemail servers, video mail servers, unified messaging servers, and text messaging servers. Computing system 300, discussed in more detail below, is representative of a general purpose computing system that may be suitable for implementing at least part or all of messaging environment 109.

In operational scenario 100, messages 101 have been generated and submitted for delivery to recipients on behalf of senders. For example, client communication devices (not shown) engaged with messaging environment 109 may engage with messaging environment 109 to facilitate sending, receiving, forwarding, and otherwise handling messages. Messaging environment 109 receives notification of each message (step 201), and may possibly receive the message itself. Upon receiving notification of the message, messaging environment 109 identifies a delivery policy to apply to the message based on all or part of the content in the message components (step 203). In operational scenario 100, delivery policy 113 and delivery policy 115 are illustrated, although it should be understood that additional delivery policies are possible.

When selecting the appropriate delivery policy for any given message, a variety of content criteria may be considered with respect to the content contained in or otherwise represented by the message components. In some implementations, the identity of a sender, a recipient, or the identity of a copied participant may be considered when identifying a delivery policy. In other implementations, the content of a message body may be considered. In yet other implementations the content of an attachment may be considered. In still other implementations, the content in a subject line may be considered.

Note that combinations and variations of the aforementioned content criteria may also be considered. In an example, the sender identity may be considered in combination with the any or all of the recipient identity, message body, subject line, and the like. Other external factors may also be considered, in addition to or in combination with the aforementioned content criteria, such as the time of day or day of week of the message. Even derivate information may be considered when selecting a delivery policy. For example, a hash may be calculated from any of the aforementioned content, such as the sender identity, recipient identity, message body, or message attachment. The hash may then be compared against hash criteria when attempting to identify the proper delivery.

Upon identifying the appropriate delivery policy, delivery of the message is initiated in accordance with the policy (step 205). A variety of delivery policies are possible, such as those pertaining to the paths traversed by a message, an environment through which a message is routed, a security level adhered to when communicating a message, and an archival process implemented for the message, as well as any other type of delivery policy, combination of policies, or variations thereof.

In a representative example, emails having content in the message body or subject line pertaining to particular topics may be flagged for heightened security. As such, applying a relevant delivery policy may result in routing of those messages through an enhanced security environment. In another example, emails having content in the message body or subject line pertaining to particular topics may be flagged for archiving. As such, applying a relevant delivery policy may result in routing of those messages through an archive environment. A wide variety of delivery policies and associates environments for implementing the delivery policies may be considered within the scope of this disclosure.

Note in operational scenario 100 that two messages are illustrated as outgoing from messaging environment 109, message 117 and message 119. Message 117 and message 119 are intended to demonstrate that each message of messages 101 may be subjected to a different delivery policy within messaging environment 109 depending upon the particular content contained within each message. In this example scenario, message 117 has been handled in accordance with delivery policy 113, whereas message 117 has been handled in accordance with delivery policy 115.

Referring now to FIG. 3, computing system 300 is generally representative of any computing system or systems on which message process 200 or variations thereof may be suitably implemented. Optionally, computing system 300 may also be suitable for implementing all of or portions of message environment 109. Examples of computing system 300 include server computers, mainframe computers, virtual machines, distributed computing systems, and Internet appliances, as well as any combination or variation thereof. Other examples of computing system 300 with which message process 200 and optionally all of portions of messaging environment 109 may sometimes be implemented include personal computers, mobile computers, media devices, desktop computers, laptop computers, tablet computers, notebook computers, mobile phones, smart phones, gaming devices, and personal digital assistants, as well as any combination or variation thereof.

Computing system 300 includes processing system 301, storage system 303, software 305, and communication interface 307. Computing system 300 also includes user interface 309, although user interface 309 is optional. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for message process 200 or variations thereof. Computing system 300 may optionally include additional devices, features, or functionality not discussed here for purposes of brevity and clarity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations of processing devices, or variations thereof.

Storage system 303 may comprise any storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or sub-systems. Storage system 303 may comprise additional elements, such as a controller, capable of communicating with processing system 301.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 305 may be implemented in program instructions and among other functions may, when executed by computing system 300, direct computing system 300 to receive a notification of a message submitted for delivery on behalf of a sender to a recipient, identify at least one delivery policy for the message based on the content identified in at least one message component, and initiate delivery of the message according to the delivery policy. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform processing system 301, and computing system 300 overall, from a general-purpose computing system into a special-purpose computing system customized to facilitate messaging sessions as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein. For example, software 305 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement message process 200 (and variations thereof) and optionally all or portions of messaging environment 109. However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to messaging environment 109. As an example, messaging environment 109 could be considered transformed from one state to another when subject to message process 200 or variations thereof. In a first state, delivery of message 117 is initiated in accordance with delivery policy 113. Upon being notified of message 119 and identifying the proper delivery policy for it, the delivery of message 119 is initiated in accordance with delivery policy 115, thereby changing messaging environment 109 to a second, different state.

Referring again to FIG. 3, communication interface 307 may include communication connections and devices that allow for communication between computing system 300 and other computing systems not shown over a communication network or collection of networks (not shown). Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 309 may include a mouse, a voice input device, a touch input device for receiving a gesture from a user, a motion input device for detecting non-touch gestures and other motions by a user, and other comparable input devices and associated processing elements capable of receiving user input from a user. Output devices such as a display, speakers, printer, haptic devices, and other types of output devices may also be included in user interface 309. The aforementioned user input devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface.

Figure 4:
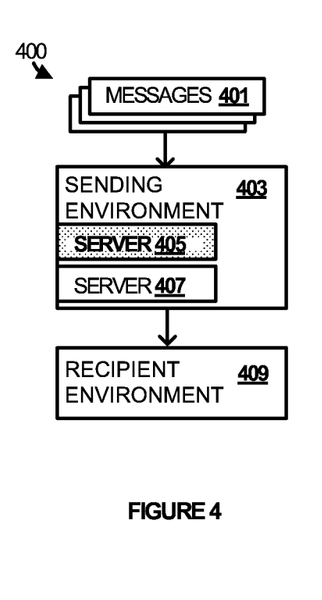
FIG. 4 illustrates an operational scenario with respect to a sending environment and a recipient environment in an implementation.
Figure 5:
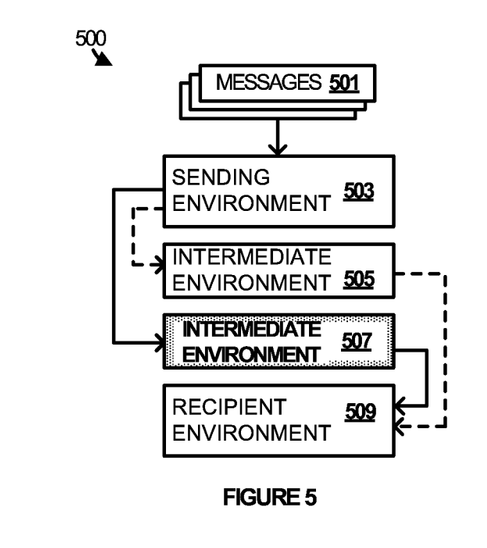
FIG. 5 illustrates an operational scenario with respect to a sending environment, intermediate environments, and a recipient environment in an implementation.

FIGS. 4-6 illustrates several different operational scenarios, although note that various combinations and variations of the scenarios are possible. Referring to FIG. 4, operational scenario 400 is illustrated whereby various delivery policies with respect to message servers are applied based on the content of messages queued for handling by the servers within a sending environment.

In operation, message clients may generate messages for delivery to recipients by way of sending environment 403. Sending environment 403 may allow clients to perform a variety of well-known messaging functions that need not be discussed at length here, such as sending, receiving, forwarding, moving, and archiving messages. Sending environment 403 may be any system, collection of systems, or software, or any combination or variation thereof, capable of handling messages in this manner. Examples of such systems and software include email servers, voicemail servers, video mail servers, unified messaging servers, and text messaging servers. Computing system 300 discussed above is representative of a general purpose computing system that may be suitable for implementing at least part or all of sending environment 403.

Sending environment 403 includes server 405 and server 407. Server 405 may provide any of a variety of roles within sending environment 403 and may perform any corresponding function on messages 401. For example, server 405 may be a mailbox server, an access server, or a transport server. Optionally server 405 may be an integrated element capable of performing multiple roles, including a mailbox role, an access role, and a transport role, as well as any other role or function. Server 405 may be some other element, separate from or in addition to the aforementioned roles, such a security element, an archive element, or the like. Server 407 may also provide any of a variety of roles within sending environment 403 and may perform any corresponding function on messages 401. For example, server 407 may also be a mailbox server, an access server, or a transport server. Optionally server 407 may be an integrated element capable of performing multiple roles, including a mailbox role, an access role, and a transport role, as well as any other role or function. Server 407 may be some other element, separate from or in addition to the aforementioned roles, such a security element, an archive element, or the like.

Sending environment 403 receives each message and identifies to which of server 405 or server 407 to route the message based on all or part of the content in the message components. Server 405 and server 407 may have different operating characteristics relative to each other that may be implicated by various delivery policies. Depending upon the content of each message, server 405 or server 407 may be called on to handle the message accordingly. The routing of the message to either server 405 or server 407 may be performed by other processing elements within sending environment 403, such as other server computers, other software server components, or any combination or variation thereof. The routing of the message to recipient environment 409 may be performed by server 405 or server 407 or by other processing elements within sending environment 403, such as other server computers, other software components, or any combination or variation thereof.

For example, server 405 may be considered a higher performance server relative to server 407. Thus, it may be a delivery policy that messages associated with certain users are handled by server 405. It may be another delivery policy that messages associated with users other than those aforementioned certain users are handled by server 407. In a similar example, it may be a delivery policy that messages having certain content contained within their message body, attachments, or subject lines are handled by server 405, while it may be another delivery policy that any other messages are handled by server 407. A wide variety of delivery policies related to performance characteristics may be considered within the scope of this disclosure and are not limited to those disclosed herein.

In another example, server 405 may have one or more different capabilities than server 407. Thus, it may be a delivery policy that messages associated with certain users are handled by server 405 such that a capability unique to server 405 may be provided. It may be another delivery policy that messages associated with users other than those aforementioned certain users are handled by server 407. In a similar example, it may be a delivery policy that messages having certain content contained within their message body, attachments, or subject lines are handled by server 405 such that a capability unique to server 405 may be provided, while it may be another delivery policy that any other messages are handled by server 407. A wide variety of delivery policies related to server capabilities may be considered within the scope of this disclosure and are not limited to those disclosed herein.

Eventually, the message or messages are handled by one or the other of server 405 and server 407. In operational scenario 400, is illustrated for exemplary purposes that server 405 handles the message. The message may be transmitted for delivery to recipient environment 409 over a communication network or collection of networks, such as the Internet. However, as will be discussed with respect to FIG. 5, some delivery policies may pertain to routing messages through specific intermediate environments based on their content.

Referring to now FIG. 5, operational scenario 500 is illustrated whereby various delivery policies with respect to intermediate environments are applied based on the content of messages queued for handling by the servers within a sending environment. In operation, message clients may generate messages for delivery to recipients by way of sending environment 503. Sending environment 503 may allow clients to perform a variety of well-known messaging functions that need not be discussed at length here, such as sending, receiving, forwarding, moving, and archiving messages. Sending environment 503 may be any system, collection of systems, or software, or any combination or variation thereof, capable of handling messages in this manner. Examples of such systems and software include email servers, voicemail servers, video mail servers, unified messaging servers, and text messaging servers. Computing system 300, discussed in more detail above, is representative of a general purpose computing system that may be suitable for implementing at least part or all of sending environment 503.

Sending environment 503 may include systems that provide any of a variety of roles within sending environment 503 and may perform any corresponding function on messages 501. For example, sending environment 503 may include mailbox servers, access servers, and transport servers, or any combination or variation thereof, including systems or servers having several roles integrated therein. Sending environment 503 may include other elements, separate from or in addition to the aforementioned roles, such a security element, an archive element, or the like.

In operational scenario 500, messaging sessions can be established between sending environment 503 and recipient environment 509 to deliver messages. Sending environment 503 receives each message and identifies through which of intermediate environment 505 and intermediate environment 507 to route the message based on all or part of the content in the message components. Intermediate environment 505 and intermediate environment 507 may have different operating characteristics relative to each other that may be implicated by various delivery policies. Depending upon the content of each message, intermediate environment 505 or intermediate environment 507 may be requested to handle the message accordingly.

For example, intermediate environment 505 may be considered a higher performance environment relative to intermediate environment 507 based on capacity, speed, or security performance, as well as any other performance factor, combination of factors, or variations thereof. Thus, it may be a delivery policy that messages associated with certain users are routed via intermediate environment 505. It may be another delivery policy that messages associated with users other than those aforementioned certain users are routed via intermediate environment 507. In a similar example, it may be a delivery policy that messages having certain content contained within their message body, attachments, or subject lines are routed via intermediate environment 505, while it may be another delivery policy that any other messages are routed via intermediate environment 507. A wide variety of delivery policies related to performance characteristics may be considered within the scope of this disclosure and are not limited to those disclosed herein.

In another example, intermediate environment 505 may have one or more different capabilities than intermediate environment 507. Thus, it may be a delivery policy that messages associated with certain users are handled by intermediate environment 507 such that a capability unique to intermediate environment 505 may be provided. It may be another delivery policy that messages associated with users other than those aforementioned certain users are handled by intermediate environment 507. In a similar example, it may be a delivery policy that messages having certain content contained within their message body, attachments, or subject lines are handled by intermediate environment 505 such that a capability unique to intermediate environment 505 may be provided, while it may be another delivery policy that any other messages are handled by intermediate environment 507. A wide variety of delivery policies related to server capabilities may be considered within the scope of this disclosure and are not limited to those disclosed herein.

Eventually, the message or messages are routed to one or the other of intermediate environment 505 and intermediate environment 507, and onward to recipient environment 509. In operational scenario 500, it is illustrated for exemplary purposes that the message is routed over intermediate environment 505. The message may then be transmitted for delivery to recipient environment 509 over a communication network or collection of networks, such as the Internet. As will be discussed with respect to FIG. 5, some delivery policies may pertain to routing messages to various servers within a recipient environment based on their content.

Referring now to FIG. 6, operational scenario 600 is illustrated whereby various delivery policies with respect to message servers are applied based on the content of messages queued for handling by the systems and sub-systems within a receiving environment. In one useful implementation, messages associated with a domain may be routed either to a mail server within recipient environment 605, or possibly routed to other mail servers external to the domain based on the content of the messages.

In operation, message clients may generate messages for delivery to recipients by way of sending environment 603. Sending environment 603 may allow clients to perform a variety of well-known messaging functions that need not be discussed at length here, such as sending, receiving, forwarding, moving, and archiving messages. Sending environment 603 may be any system, collection of systems, or software, or any combination or variation thereof, capable of handling messages in this manner. Examples of such systems and software include email servers, voicemail servers, video mail servers, unified messaging servers, and text messaging servers. Computing system 300, discussed in more detail above, is representative of a general purpose computing system that may be suitable for implementing at least part or all of sending environment 603.

Sending environment 603 may include systems that provide any of a variety of roles within sending environment 603 and may perform any corresponding function on messages 601. For example, sending environment 603 may include mailbox servers, access servers, and transport servers, or any combination or variation thereof, including systems or servers having several roles integrated therein. Sending environment 603 may include other elements, separate from or in addition to the aforementioned roles, such a security element, an archive element, or the like.

In operational scenario 600, messaging sessions can be established between sending environment 603 and recipient environment 605 to deliver messages. Sending environment 603 receives each message and identifies a recipient destination for them. In this example, the recipient destination is recipient environment 605. Sending environment 603 then establishes a session with recipient environment 605 over which to communicate the message.

Recipient environment 605 may also allow clients to perform a variety of well-known messaging functions that need not be discussed at length here, such as sending, receiving, forwarding, moving, and archiving messages. Recipient environment 605 may be any system, collection of systems, or software, or any combination or variation thereof, capable of handling messages in this manner. Examples of such systems and software include email servers, voicemail servers, video mail servers, unified messaging servers, and text messaging servers. Computing system 300 discussed above is representative of a general purpose computing system that may be suitable for implementing at least part or all of recipient environment 605.

Recipient environment 605 includes server 607 and is associated with domain 609. The association between recipient environment 605 and domain 609 may cause messages having recipient addresses associated with domain 609 to be routed to recipient environment 605. Server 607 may provide any of a variety of roles within recipient environment 605 and may perform any corresponding function on messages 601. For example, server 607 may be a mailbox server, an access server, or a transport server. Optionally server 607 may be an integrated element capable of performing multiple roles, including a mailbox role, an access role, and a transport role, as well as any other role or function. Server 607 may be some other element, separate from or in addition to the aforementioned roles, such a security element, an archive element, or the like.

Recipient environment 605 receives each message and identifies whether or not to route the message internally or externally to recipient environment 605 based on all or part of the content the components of each message. In particular, a determination is made whether or not to route the message to server 607, within domain 609, or to recipient environment 611 and server 613 external to domain 609. In this example, it is assumed for illustrative purposes that server 613 is identified as the proper destination for the message based on its content. Accordingly, recipient environment 605 routes the message to server 613. The routing of the message to either server 607 or server 613 may be performed by other processing elements within recipient environment 605, such as other server computers, other software server components, or any combination or variation thereof.

Server 613 may provide a variety of roles within recipient environment 611 and may perform any corresponding function on messages 601. For example, server 613 may be a mailbox server, an access server, or a transport server. Optionally server 613 may be an integrated element capable of performing multiple roles, including a mailbox role, an access role, and a transport role, as well as any other role or function. Server 613 may be some other element, separate from or in addition to the aforementioned roles, such a security element, an archive element, or the like.

It may be desirable to route message externally to domain 609 for a variety of reasons. For example, having recipient environment 605 receive messages and route them to other domains based on the content of the messages may eliminate or reduce the reliance upon address and domain translation systems. In an example, messages may be routed to either server 607 or server 613 based only on the content of the messages, and possibly other factors external to server 607 and server 613, such as load balancing concerns. In an example, recipient environment 605 may be associated with a domain, represented by domain 609. The identity of some recipients may be associated with the same domain, causing sending environment 603 to deliver messages on their behalf to recipient environment 605.

However, it may be useful for messages to a subset of recipients to be forwarded or otherwise sent to a different mailbox, mail server, or other similar system than the system that may receive the messages from sending environment 603. To accomplish this, recipient environment 605 may examine the name of the recipient associated with any given message and may route the message based on a delivery policy for that name.

In some implementations, the name of the recipient may be identified as part of the recipient address contained in the message. For example, an email address may contain all or part of a recipient's name. In other implementations, a look-up may be performed using the recipient address to determine the recipient's name. In yet other implementations, the recipient address may be a suitable replacement for the recipient's name. In any case, a delivery policy for that recipient may be identified based on the recipient's identity and messages for that recipient routed accordingly.

In one particular example, a subsidiary company may have been acquired by a parent company and the email addresses for the employees of the subsidiary converted to the domain of the parent company. Thus, email messages to those employees would be routed to the recipient email environment supported by the parent company. According to this alternative, the recipient email environment may perform a look-up to determine whether or not any incoming messages pertain to employees of the subsidiary based on a name identified in the messages. Qualifying messages may then be sent to or otherwise provided to other corresponding message systems, sub-systems, servers, and the like. This may occur without requiring yet another look-up to a message address database, such as an MX record database. Rather, the translation may be performed internally within the recipient email environment. Upon determining the identity of the appropriate server to handle forwarded messages, the element handling incoming messages within the recipient environment would establish a message session with the server in order to communicate the messages.

For example, server 607 may be considered a higher performance server relative to server 613. Thus, it may be a delivery policy that messages associated with certain users are handled by server 607. It may be another delivery policy that messages associated with users other than those aforementioned certain users are handled by server 613. In a similar example, it may be a delivery policy that messages having certain content contained within their message body, attachments, or subject lines are handled by server 607, while it may be another delivery policy that any other messages are handled by server 613. A wide variety of delivery policies related to performance characteristics may be considered within the scope of this disclosure and are not limited to those disclosed herein.

In another example, server 607 may have one or more different capabilities than server 613. Thus, it may be a delivery policy that messages associated with certain users are handled by server 607 such that a capability unique to server 607 may be provided. It may be another delivery policy that messages associated with users other than those aforementioned certain users are handled by server 613. In a similar example, it may be a delivery policy that messages having certain content contained within their message body, attachments, or subject lines are handled by server 607 such that a capability unique to server 607 may be provided, while it may be another delivery policy that any other messages are handled by server 613. A wide variety of delivery policies related to server capabilities may be considered within the scope of this disclosure and are not limited to those disclosed herein.

Eventually, the message or messages are routed to one or the other of server 607 and server 613. In operational scenario 600, it is illustrated for exemplary purposes that server 613 handles the message. The message may be communicated to a client for viewing or other operations over a communication network or collection of networks, such as the Internet.

Referring now to FIG. 7, operational scenario 700 is illustrated whereby messages may be routed internally to a domain or externally to the domain based on upon content within the messages. In operation, message clients may generate messages for delivery to recipients by way of sending environment 703. Sending environment 703 may allow clients to perform a variety of well-known messaging functions that need not be discussed at length here, such as sending, receiving, forwarding, moving, and archiving messages. Sending environment 703 may be any system, collection of systems, or software, or any combination or variation thereof, capable of handling messages in this manner. Examples of such systems and software include email servers, voicemail servers, video mail servers, unified messaging servers, and text messaging servers. Computing system 300, discussed in more detail above, is representative of a general purpose computing system that may be suitable for implementing at least part or all of sending environment 703.

Sending environment 703 may include systems that provide any of a variety of roles within sending environment 703 and may perform any corresponding function on messages 701. For example, sending environment 703 may include mailbox servers, access servers, and transport servers, or any combination or variation thereof, including systems or servers having several roles integrated therein. Sending environment 703 may include other elements, separate from or in addition to the aforementioned roles, such a security element, an archive element, or the like.

In operational scenario 700, messaging sessions can be established between sending environment 703 and recipient environment 709 external to domain 707 to deliver messages. Messaging sessions can also be established between sending environment 703 and recipient environment 705 within domain 707. Sending environment 703 receives each message and identifies a recipient destination for them based on the content represented therein.

In one example, the destination may be recipient environment 709. Sending environment 703 then establishes a session with recipient environment 709 over which to communicate the message. In other examples, the destination may be recipient environment 705 within domain 707. Sending environment 703 may then establish a session with recipient environment 705 over which to communication the message. The routing of the message to either recipient environment 705 or recipient environment 709 may be performed by other processing elements within sending environment 703, such as other server computers, other software server components, or any combination or variation thereof.

Recipient environment 709 may allow clients to perform a variety of well-known messaging functions that need not be discussed at length here, such as sending, receiving, forwarding, moving, and archiving messages. Recipient environment 709 may be any system, collection of systems, or software, or any combination or variation thereof, capable of handling messages in this manner. Examples of such systems and software include email servers, voicemail servers, video mail servers, unified messaging servers, and text messaging servers. Computing system 300 discussed above is representative of a general purpose computing system that may be suitable for implementing at least part or all of recipient environment 709.

Recipient environment 705 is associated with domain 707. The association between recipient environment 705 and domain 707 may cause messages having recipient addresses associated with domain 707 to be routed within domain 707. For example, reliance upon queries to address translation systems, such as an MX record database, may be avoided since the identity of recipient environment 705 and its systems and sub-systems may already be known. Recipient environment 705 may include various servers and systems capable of providing any of a variety of roles within recipient environment 705 and may perform any corresponding function on messages 701, such as a mailbox server, an access server, or a transport server.

The decision to route messages to recipient environment 705 within domain 707 or recipient environment 709 may be based on all or part of the content in the components of each message. For example, messages may be kept within domain 707 based on the content with the message body, message subject line, or message attachments. In another example, messages may be kept within domain 707 and routed to recipient environment 709 based on the name or identity of the recipient.

In some implementations, the name of the recipient may be identified as part of the recipient address contained in the message. For example, an email address may contain all or part of a recipient's name. In other implementations, a look-up may be performed using the recipient address to determine the recipient's name. In yet other implementations, the recipient address may be a suitable replacement for the recipient's name. In any case, a delivery policy for that recipient may be identified based on the recipient's identity and messages for that recipient routed accordingly.

In one particular example, a subsidiary company may have been acquired by a parent company and the email addresses for the employees of the subsidiary converted to the domain of the parent company. Thus, email messages to those employees would be routed to the recipient email environment supported by the parent company. According to this example, the sending email environment may perform a look-up to determine whether or not any incoming messages pertain to employees of the subsidiary based on a name identified in the messages. Qualifying messages may then be sent to or otherwise provided to other corresponding message systems, sub-systems, servers, and the like within the same domain. This may occur without requiring yet another look-up to a message address database, such as an MX record database. Rather, the translation may be performed internally within the sending email environment. Upon determining the identity of the appropriate recipient environment to handle forwarded messages, the element handling incoming messages within the recipient environment would establish a message session with the sending environment in order to communicate the messages.

FIG. 8 illustrates messaging architecture 800 in an implementation. Message architecture may be representative of any collection of systems capable of carrying out the various scenarios discussed above, although note that a variety of architectures may be suitable. Messaging architecture 800 includes communication network 801 over which sending system 803 may communicate with archive system 805, security system 807, and recipient system 809. Devices 813, 815, and 817 may also communicate by way of communication network 801.

Communication network 801 may be any network or collection of networks capable of routing communications between the elements of messaging architecture 800 in the context of message sessions, such as an email session. Communications may be exchanged over communication network 801 in accordance with a variety of protocols, such as the transmission control protocol (TCP), the user datagram protocol (UDP), the Internet protocol (IP), IPv4, IPv6, Ethernet, and the Point-to-Point (PPP) protocol, as well as any other protocol, combination of protocols, or variations thereof. Communication networking technologies ad well known and need not be discussed at length here.

Devices 813, 815, and 817 may each be any device capable of providing all or a portion of a client messaging application to interface with server messaging applications, such as those executing on sending system 803 and recipient system 809. The client messaging application may be provisioned in accordance with a wide variety of application models, such as a locally installed model, a hosted model, a streaming model, or a hybrid model. For example, the client messaging application may be a stand-alone email client. Alternatively, the client message application may be provided within another application, such as a web browser. Example protocols that may be implemented by the message clients include the Internet mail access protocol (IMAP), the post office protocol (POP), and the simple mail transfer protocol (SMTP), as well as any other protocol, combination of protocols, or variations thereof. Proprietary protocols may also be implemented, such as the Lotus Notes protocol or Microsoft® Exchange® protocol. Examples of devices 813, 815, and 817 include, but are not limited to, personal computers, mobile computers, media devices, desktop computers, laptop computers, tablet computers, notebook computers, mobile phones, smart phones, gaming devices, and personal digital assistants, as well as any combination or variation thereof.

Sending system 803 may be any system, sub-system, or collection of systems capable of hosting message server applications in order to send messages submitted by clients. Note that sending system 803 may also be capable of providing a recipient role. Example protocols that may be implemented by the message server applications on sending system 803 include IMAP, POP, SMTP, Lotus Notes, and Microsoft® Exchange®, as well as any other suitable protocol, combination of protocols, and variations thereof. Examples of sending system 803 include server computers, blade servers, virtual machines, mainframe computers, and Internet appliances, as well as any combination or variation thereof. Sending system 803 may be capable of interfacing with a variety of client messaging applications, including locally installed clients, hosted clients, streamed clients, hybrid clients, or any other variation.

Recipient system 809 may be any system, sub-system, or collection of systems capable of hosting message server applications in order to receive message transmitted by sending system 803 and communicating the messages to clients. Note that recipient system 809 may also be capable of providing a sending role. Example protocols that may be implemented by the message server applications on recipient system 809 include IMAP, POP, SMTP, Lotus Notes, and Microsoft® Exchange®, as well as any other suitable protocol, combination of protocols, and variations thereof. Examples of recipient system 809 include server computers, blade servers, virtual machines, mainframe computers, and Internet appliances, as well as any combination or variation thereof. Recipient system 809 may be capable of interfacing with a variety of client messaging applications, including locally installed clients, hosted clients, streamed clients, hybrid clients, or any other variation.

Archive system 805 may be any system or collection of systems capable of archiving messages. Archive system 805 may also include messaging components capable of sending and possibly receiving messages and communicating according to various messaging protocols, such as SMTP. Security system 807 may be any system or collection of systems capable of providing security services, such as encryption and anti-virus detection, for message services. Security system 807 may also include various messaging components capable of sending and possibly receiving messages and communicating according to various messaging protocols, such as SMTP.

MX record system 811 may be representative of any system capable of hosting mail exchanger (MX) records. MX records are resource records in the domain name system (DNS) that specific which recipient system is responsible for accepting email messages. MX record system 811 may be queried by any of sending system 803, archive system 805, or security system 807 in order to obtain an address for communicating with recipient systems.

FIG. 9 illustrates a brief operational sequence messaging architecture 800 in one implementation. In this example sequence, sending system 803 may receive a notification of a message submitted for delivery on behalf of a sender to a recipient. For example, device 813 may communicate with sending system 803, either directly or possibly indirectly via another system such as a web server, to initiate an email. The message may include several components, such as sender and recipient fields, a message body, a message subject, and other components. Sending system 803 identifies at least one delivery policy for the message, from a number of possible delivery policies, based on the content identified in at least one of the components. Sending system 803 communicates with MX record system 811 to identify routing information for a destination system with which to route the message. Having identified the destination system, sending system 803 initiates delivery of the message according to the delivery policy.

In some implementations, the delivery policies may define through which intermediate environment to route the message between the sending environment and the recipient environment. The intermediate environments may each be a different one of multiple message services, such as a security service and an archive service. In another example, the intermediate environments may each be a different physical path between the sending environment and the recipient environment. In yet other implementations, the delivery policies define which of the security levels to apply to messages when routed between a sending environment and a recipient environment.

In one implementation, the messages submitted for delivery are examined for content represented therein that may qualify for handling according to a delivery policy and delivery is initiated accordingly for at least a portion of any qualifying email messages.

In this particular example, it is assumed for illustrative purposes that the delivery policy specifies that the message be routed through archive system 805. Accordingly, sending system 803 communicates the message to archive system 805 for archiving. Note that archive system 805 may be capable of communicating with MX record system 811 to determine routing information for the message. This may occur in place of sending system 803 performing such a function. In other words, it may be possible that sending system 803 communicate the message to archive system 805, allowing archive system 805 to establish a message session with recipient system 809 to deliver the message. Other implementation scenarios are possible and may be considered within the scope of this disclosure.

In one implementation scenario, the message system may examine at least a portion of any non-qualifying messages for non-qualifying content represented therein. The non-qualifying content can then be processed to generate a configuration menu including configuration options corresponding to the non-qualifying content. Selecting the configuration options may allow for reconfiguring the delivery policies. Upon selection of at least one of the configuration options, one of the delivery policies can be reconfigured.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for facilitating messaging sessions wherein the program instructions, when executed by a computing system, direct the computing system to at least:

receive a notification of an email message submitted for delivery on behalf of a sender to a recipient, the email message comprising a plurality of components having content included therein and comprising an identity of the sender, an identity of the recipient, and an identity of a copied participant;

identify at least one delivery policy for the email message, of a plurality of delivery policies, based at least in part on the identity of the copied participant; and initiate delivery of the email message according to the delivery policy;

wherein the plurality of delivery policies define through which intermediate environment of a plurality of intermediate environments, if any, to route the email message between a sending environment and a recipient environment.

2. The one or more computer readable storage media of claim 1 wherein the intermediate environment comprises a server that queries a mail exchanger (MX) record system to obtain routing information for the email message.

3. The one or more computer readable storage media of claim 2 wherein each of the plurality of intermediate environments comprises a different one of a plurality of message services.

4. The one or more computer readable storage media of claim 3 wherein the plurality of message services comprises an archive service and a security service.

5. The one or more computer readable storage media of claim 1 wherein each of the plurality of intermediate environments comprises a different physical path between the sending environment and the recipient environment.

6. The one or more computer readable storage media of claim 1 wherein the plurality of delivery policies define which of a plurality of security levels to apply to the email message when routed between the sending environment and the recipient environment.

7. The one or more computer readable storage media of claim 1 wherein the plurality of delivery policies define to which of a plurality of servers within the recipient environment to route the email message.

8. A method of operating a computing system to facilitate messaging sessions in a messaging environment, the method comprising:
in the computing system, receiving a notification of an email message submitted for delivery on behalf of a sender to a recipient, the email message comprising a plurality of components;
in the computing system, identifying at least one delivery policy for the email message, of a plurality of delivery policies, based on information contained in at least one of the plurality of components that comprises an identity of a copied participant; and
in the computing system, initiating delivery of the email message according to the delivery policy;
wherein the plurality of delivery policies define through which intermediate environment of a plurality of intermediate environments, if any, to route the email message between a sending environment and a recipient environment.

9. The method of claim 8 wherein the intermediate environment comprises a server that queries a mail exchanger (MX) record system to obtain routing information for the email message.

10. The method of claim 9 wherein each of the plurality of intermediate environments comprises a different one of a plurality of message services.

11. The method of claim 10 wherein the plurality of message services comprises an archive service and a security service.

12. The method of claim 8 wherein each of the plurality of intermediate environments comprises a different physical path between the sending environment and the recipient environment.

13. The method of claim 8 wherein the plurality of delivery policies defines which of a plurality of security levels to apply to the email message when routed between the sending environment and the recipient environment.

14. The method of claim 8 wherein the plurality of delivery policies further define to which of a plurality of mailbox servers within the recipient environment to route the email message.

15. One or more computer readable storage media having stored thereon program instructions for facilitating messaging sessions that, when executed by a computing system, direct the computing system to at least:
receive a plurality of email messages submitted for delivery from a sending environment to a recipient environment;
examine the plurality of email messages for content represented therein that includes an identity of a copied participant that qualifies for handling according to a delivery policy; and
responsively initiate delivery of at least a portion of any qualifying email messages of the plurality of email messages according to the delivery policy;
wherein the plurality of delivery policies define through which intermediate environment of a plurality of intermediate environments, if any, to route the email message between the sending environment and the recipient environment.

16. The one or more computer readable storage media of claim 15 wherein the intermediate environment comprises a server that queries a mail exchanger (MX) record system to obtain routing information for the qualifying email messages.

17. The one or more computer readable storage media of claim 16 wherein each of the plurality of intermediate environments comprises a different one of a plurality of message services comprising an archive service and a security service.

18. The one or more computer readable storage media of claim 15 wherein each of the plurality of intermediate environments comprises a different physical path between the sending environment and the recipient environment.

19. The one or more computer readable storage media of claim 15 wherein the plurality of delivery policies define which of a plurality of security levels to apply to the plurality of email messages when routed between a sending environment and a recipient environment.

20. The one or more computer readable storage media of claim 15 wherein the program instructions further direct the computing system to:
examine at least a portion of any non-qualifying messages of the plurality of email messages for non-qualifying content represented therein;
responsively generate a configuration menu comprising configuration options corresponding to the non-qualifying content for reconfiguring of at least a portion of the plurality of delivery policies; and
upon selection of at least one of the configuration options, reconfigure at least one of the plurality of delivery policies.

* * * * *